(12) United States Patent
Lappe et al.

(10) Patent No.: US 12,467,645 B2
(45) Date of Patent: Nov. 11, 2025

(54) ROOM HUMIDIFIER

(71) Applicant: Hyku Home Inc, Austin, TX (US)

(72) Inventors: Lucas Lappe, Austin, TX (US); Justin Seidenfeld, Austin, TX (US); Aaron Saxton, New York, NY (US); King Shing Chan, Hong Kong (HK); Yuk Cheung Wong, Hong Kong (HK)

(73) Assignee: Hyku Home Inc

( * ) Notice: Subject to any disclaimer, the term of this patent is extended or adjusted under 35 U.S.C. 154(b) by 612 days.

(21) Appl. No.: 17/483,791

(22) Filed: Sep. 23, 2021

(65) Prior Publication Data
US 2022/0107100 A1 Apr. 7, 2022

Related U.S. Application Data

(60) Provisional application No. 63/086,565, filed on Oct. 1, 2020.

(51) Int. Cl.
*F24F 6/04* (2006.01)
*F24F 6/00* (2006.01)

(52) U.S. Cl.
CPC ........ *F24F 6/043* (2013.01); *F24F 2006/008* (2013.01)

(58) Field of Classification Search
CPC ... F24F 6/043; F24F 2006/008; F24F 11/0008
USPC ................ 261/DIG. 88, 102, 105, DIG. 46
See application file for complete search history.

(56) References Cited

U.S. PATENT DOCUMENTS 3,361,415 A * 1/1968 Lane ..................... G05D 22/02
 210/138
3,840,001 A * 10/1974 Ernest ....................... F24F 3/14
 261/26
4,165,835 A * 8/1979 Dearling ................... A61L 9/12
 239/45
4,752,422 A * 6/1988 Uchida ............... B05B 17/0615
 261/DIG. 65
5,061,405 A * 10/1991 Stanek .................... F24F 6/043
 261/104
6,196,527 B1 * 3/2001 Huang ...................... F24F 6/18
 261/DIG. 65

(Continued)

FOREIGN PATENT DOCUMENTS

JP 61-169316 U * 10/1986

OTHER PUBLICATIONS

Partial Machine Translation of JP 61-169316 U (Year: 1986).*

*Primary Examiner* — Charles S Bushey
(74) *Attorney, Agent, or Firm* — Bochner PLLC; Andrew D. Bochner (57) ABSTRACT

An evaporative humidifier including a wicking filter reduce the proclivity for mold growth using one or more of: a disinfecting light emitting diode (LED) and at least one sensor adapted to determine whether water is present in a particular area of the device and to operate a fan or blower while water is present. A method can include operating a blower that passes air about or through a humidifying wick that has been made wet by a supply of water; determining a first absolute or relative time at which the wick ceases to be made wet by the supply of water; and automatically deactivating the blower at a second absolute or relative time, wherein the second time is later than the first time by an amount of time sufficient to cause the wick to be dried by the blower.

12 Claims, 6 Drawing Sheets

(56) References Cited

U.S. PATENT DOCUMENTS

| | | | |
|---|---|---|---|
| 6,354,572 B1 * | 3/2002 | Menassa | F24F 6/043 |
| | | | 261/106 |
| 6,394,427 B1 * | 5/2002 | Guetersloh | F24F 11/30 |
| | | | 261/106 |
| 6,550,748 B2 * | 4/2003 | Stanek | F24F 6/00 |
| | | | 261/96 |
| 6,796,550 B2 * | 9/2004 | Mulvaney | F24F 6/043 |
| | | | 73/29.02 |
| 6,945,519 B2 | 9/2005 | Parker et al. | |
| 8,770,557 B2 * | 7/2014 | Kanel | F24F 6/025 |
| | | | 261/DIG. 65 |
| 8,940,085 B2 | 1/2015 | Markham et al. | |
| 9,482,440 B2 | 11/2016 | Markham et al. | |
| 9,732,969 B2 | 8/2017 | Lee et al. | |
| 10,286,099 B2 * | 5/2019 | Le | B05B 7/0081 |
| D961,059 S * | 8/2022 | Lappe | D23/356 |
| 2002/0189345 A1 * | 12/2002 | Mulvaney | G01F 23/22 |
| | | | 340/622 |
| 2015/0273500 A1 * | 10/2015 | Banco | A61L 9/14 |
| | | | 239/302 |
| 2023/0049955 A1 * | 2/2023 | Lappe | A61L 9/046 |

* cited by examiner

ROOM HUMIDIFIER

RELATED APPLICATIONS

The subject matter of this application is related to U.S. Design patent application No. 29/753,050, filed on 2020 Sep. 29 and U.S. Provisional Patent Application No. 63/086,565, filed on 2020 Oct. 1, all of which applications are incorporated herein by reference in their entireties.

BACKGROUND OF THE INVENTION

Humidifiers, which can include room humidifiers and whole house humidifiers, are common household appliances used to increase humidity of indoor environments. They are predominantly used by people that suffer from seasonal allergies, and recommended by pediatricians to use in a newborn baby's sleeping environment, as they help treat dryness of the skin, hair, nose, throat, and lips. In addition to treating symptoms of dry skin, they have also been shown to ease symptoms caused by the flu or common cold. The most common type of humidifier is an ultrasonic humidifier, a device that uses high frequency vibrations to produce a mist that is dispelled out of the machine into the environment.

An evaporative humidifier uses an internal fan that blows air across a wicking component that has been saturated with water. The wicking component can be, for example, a paper mesh wick which can be wetted by a reservoir or continuously flowing stream of water. A fan can be used to move air over or through the wick, resulting in the evaporation of the water and dispelling the resulting aerosolized water droplets out of the humidifier.

Despite their popularity, there is a health risk associated with using humidifiers. Firstly, ultrasonic humidifiers may dispel mist that contains aerosolized minerals or metals that may be in the water deposited into the device. These inorganic compounds may be dangerous if inhaled, which is why most ultrasonic humidifier manufacturers recommend that only distilled water should be used with their device. Secondly, both ultrasonic & evaporative humidifiers are prone to enabling mold growth. If a paper mesh wick stays wet for long periods of time, mold or other microbes can grow on the wick, which in turn can contaminate the air being humidified.

Mold, a dangerous fungus which can be harmful to humans if ingested or inhaled and a known irritant for skin, eyes and lungs, will often be introduced & flourish in a high humidity environments within a traditional humidifier system, as the combination of stagnant air and residual moisture in the system is an optimal breeding environment for mold. This mold can then be dispelled from the humidifier into the environment, and ultimately come into contact with users to harm them or irritate their skin, eyes and lungs.

SUMMARY OF THE INVENTION

An evaporative humidifier including a wicking filter reduce the proclivity for mold growth using one or more of: a disinfecting light emitting diode (LED) and at least one sensor adapted to determine whether water is present in a particular area of the device and to operate a fan or blower while water is present.

A method can include operating a blower that passes air about or through a humidifying wick that has been made wet by a supply of water; determining a first absolute or relative time at which the wick ceases to be made wet by the supply of water; and automatically deactivating the blower at a second absolute or relative time, wherein the second time is later than the first time by an amount of time sufficient to cause the wick to be dried by the blower.

The supply of water can be one of a reservoir of water in which the wick is immersed, and a stream of water that flows through the wick.

"Determining a first absolute or relative time at which the wick ceases to be made wet by the supply of water" can include one of: determining that the reservoir of water has become dry, and stopping the stream of water.

"Determining a first absolute or relative time at which the wick ceases to be made wet by the supply of water" can include receiving a signal from a sensor, the signal indicating that the reservoir of water has become dry.

The sensor can be positioned: in or on the wick; or in the reservoir.

The second time can be a predetermined amount of time after the first time.

The method can further include: determining the second time based on measured ambient humidity.

The method can further include: determining the second time based on measured ambient humidity over time.

The determining the first absolute or relative time can consist of setting a timer.

The timer can be a countdown timer.

The "deactivating the blower" can be performed in response to expiration of the countdown timer.

The determining the first absolute or relative time can include recording a time.

The method can further include: automatically causing the wick to again be made wet by the supply of water at a third absolute or relative time, wherein the third time is later than the second time by an amount of time sufficient to inhibit the growth of microbes on the wick.

The method can further include reactivating the blower in association with "automatically causing the wick to again be made wet by the supply of water".

The method can further include: operating the blower in response to determining that the wick is wet or being made wet by the supply of water.

As will be appreciated by one skilled in the art, multiple aspects described in this summary can be variously combined in different operable embodiments. All such operable combinations, though they may not be explicitly set forth in the interest of efficiency, are specifically contemplated by this disclosure.

DETAILED DESCRIPTION

In the following description, references are made to various embodiments in accordance with which the disclosed subject matter can be practiced. Some embodiments may be described using the expressions one/an/another embodiment or the like, multiple instances of which do not necessarily refer to the same embodiment. Particular features, structures or characteristics associated with such instances can be combined in any suitable manner in various embodiments unless otherwise noted. By way of example, this disclosure may set out a set or list of a number of options or possibilities for an embodiment, and in such case, this disclosure specifically contemplates all clearly feasible combinations and/or permutations of items in the set or list.

Device

Figure 1:
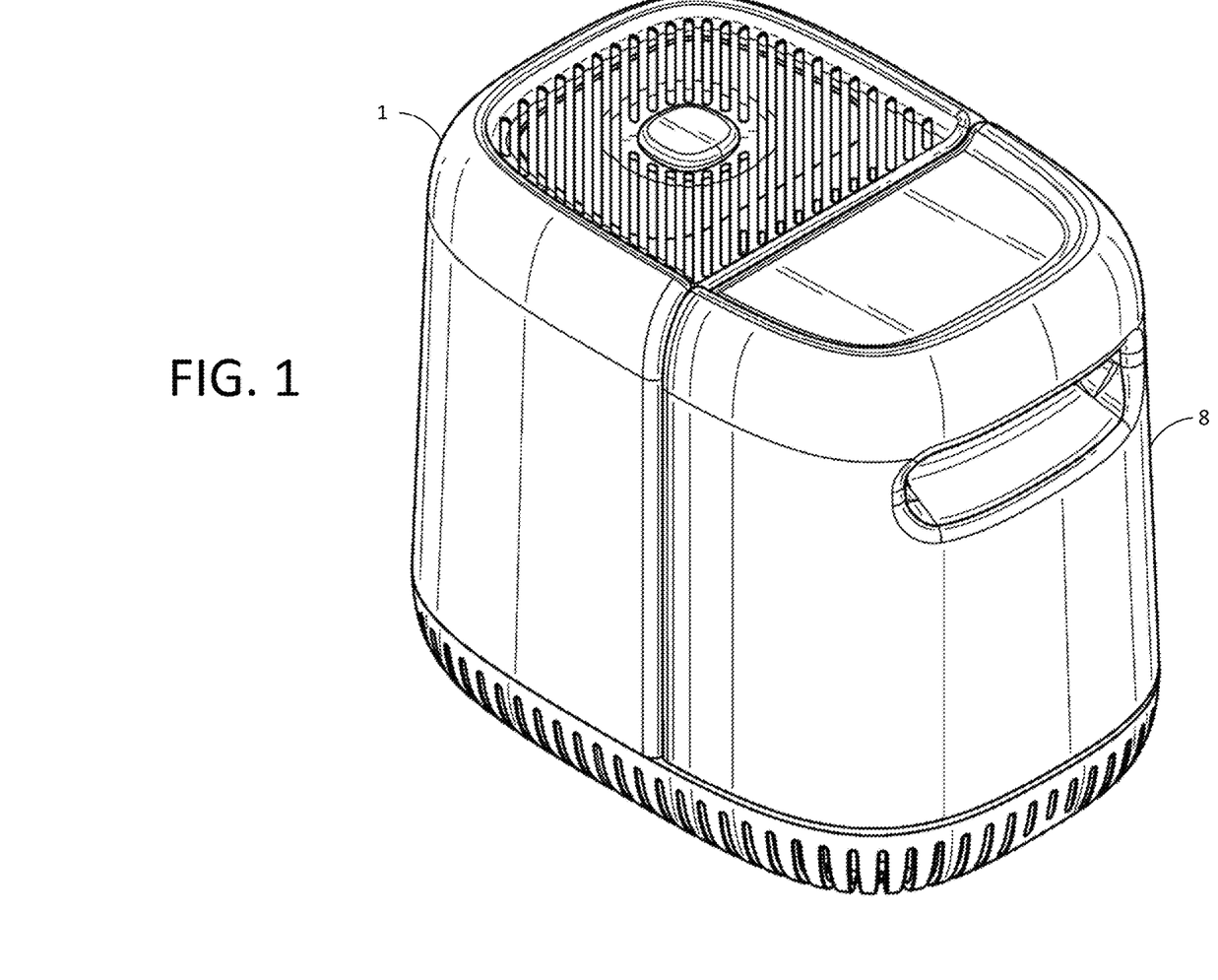
FIG. 1 illustrates an outside perspective view of a room humidifier in accordance with one embodiment.

FIG. 1 illustrates an outside perspective view of a room humidifier in accordance with one embodiment. Referring to FIG. 1, the humidifier can include an outer case 1, which receives a water tank 8 that can be filled and which supplies water to the humidifier.

Figure 2:
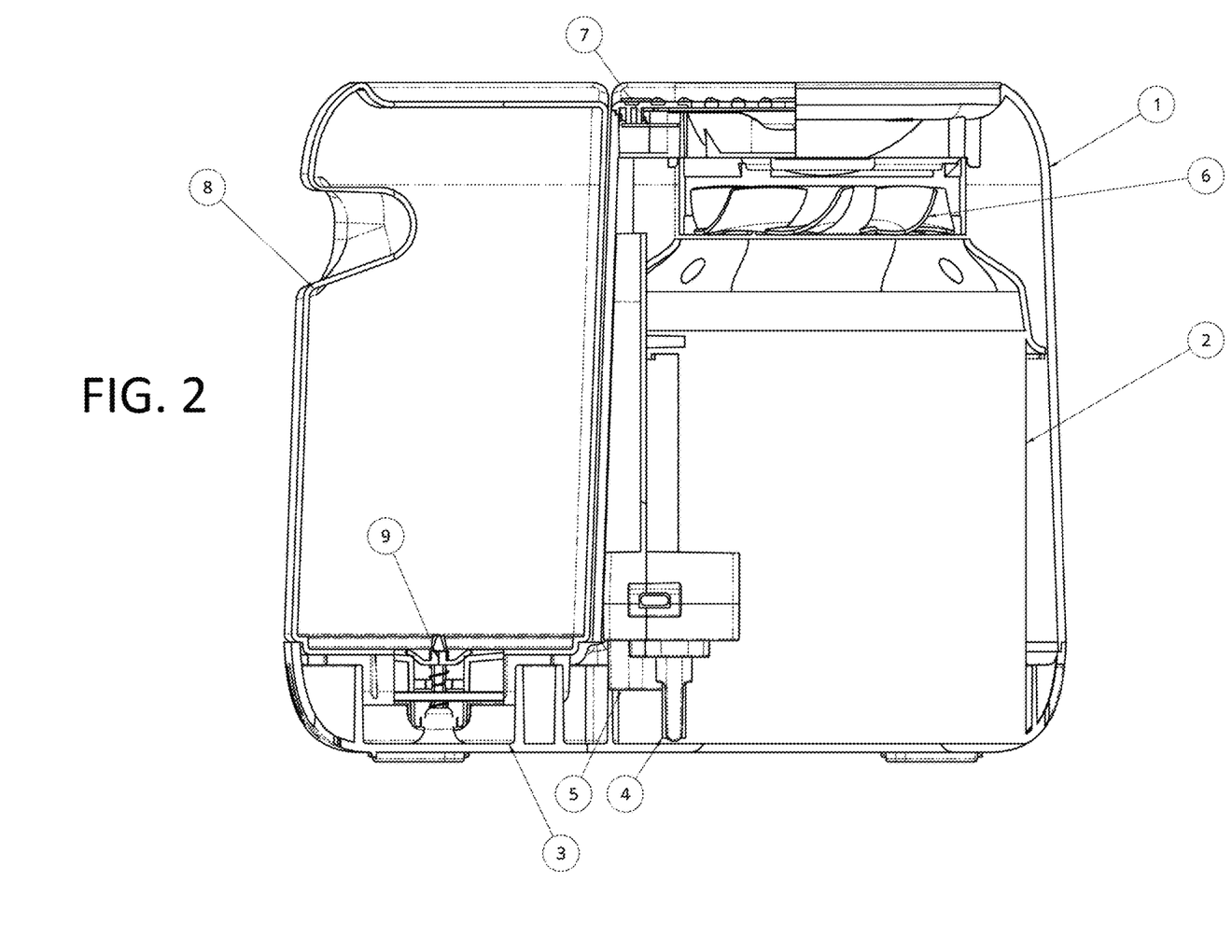
FIG. 2 illustrates a vertical cross sectional view of the humidifier of FIG. 1 showing certain enumerated internal components.
Figure 3:
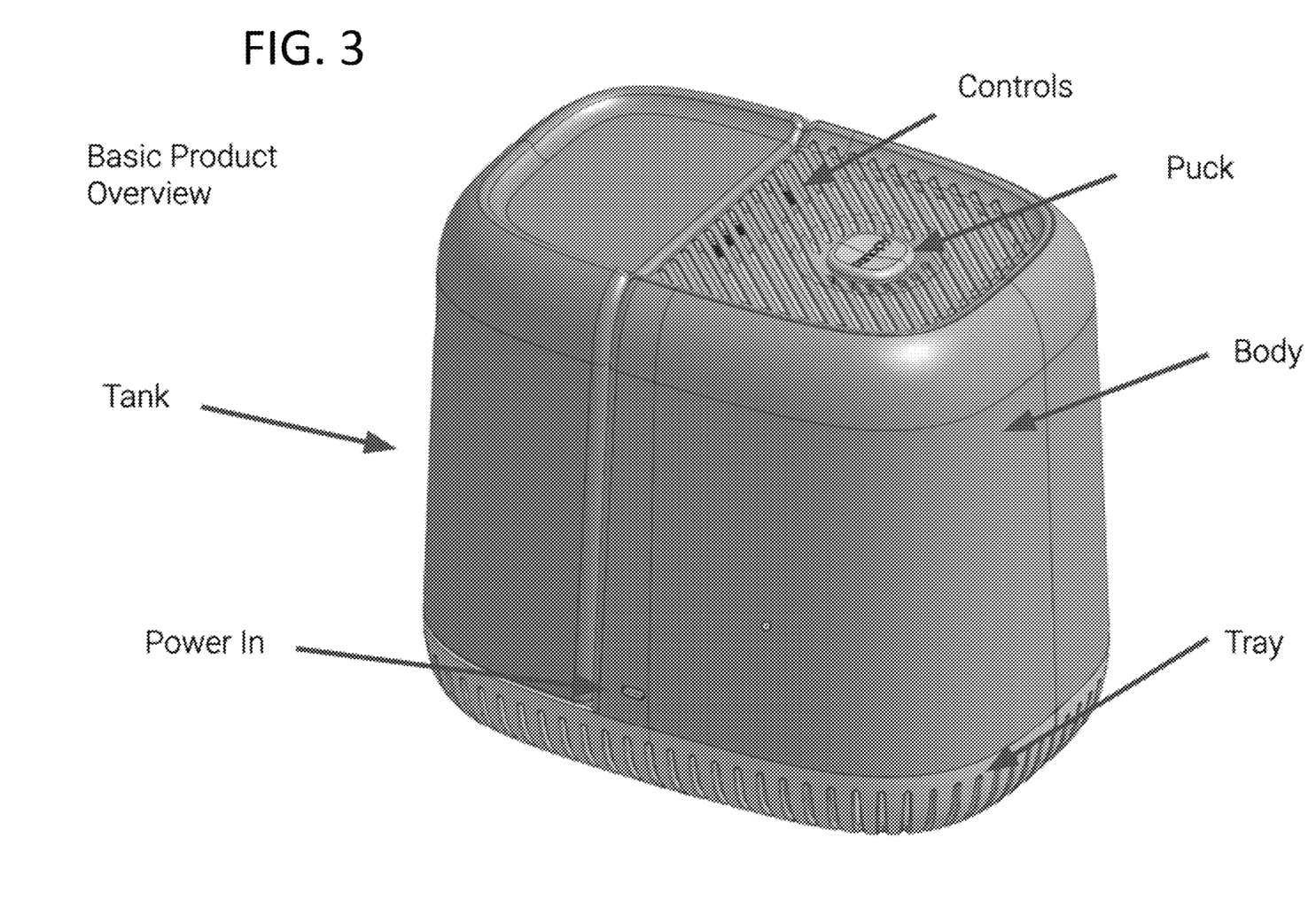
FIG. 3 illustrates an additional outside perspective view of the room humidifier in accordance with one embodiment.
Figure 4:
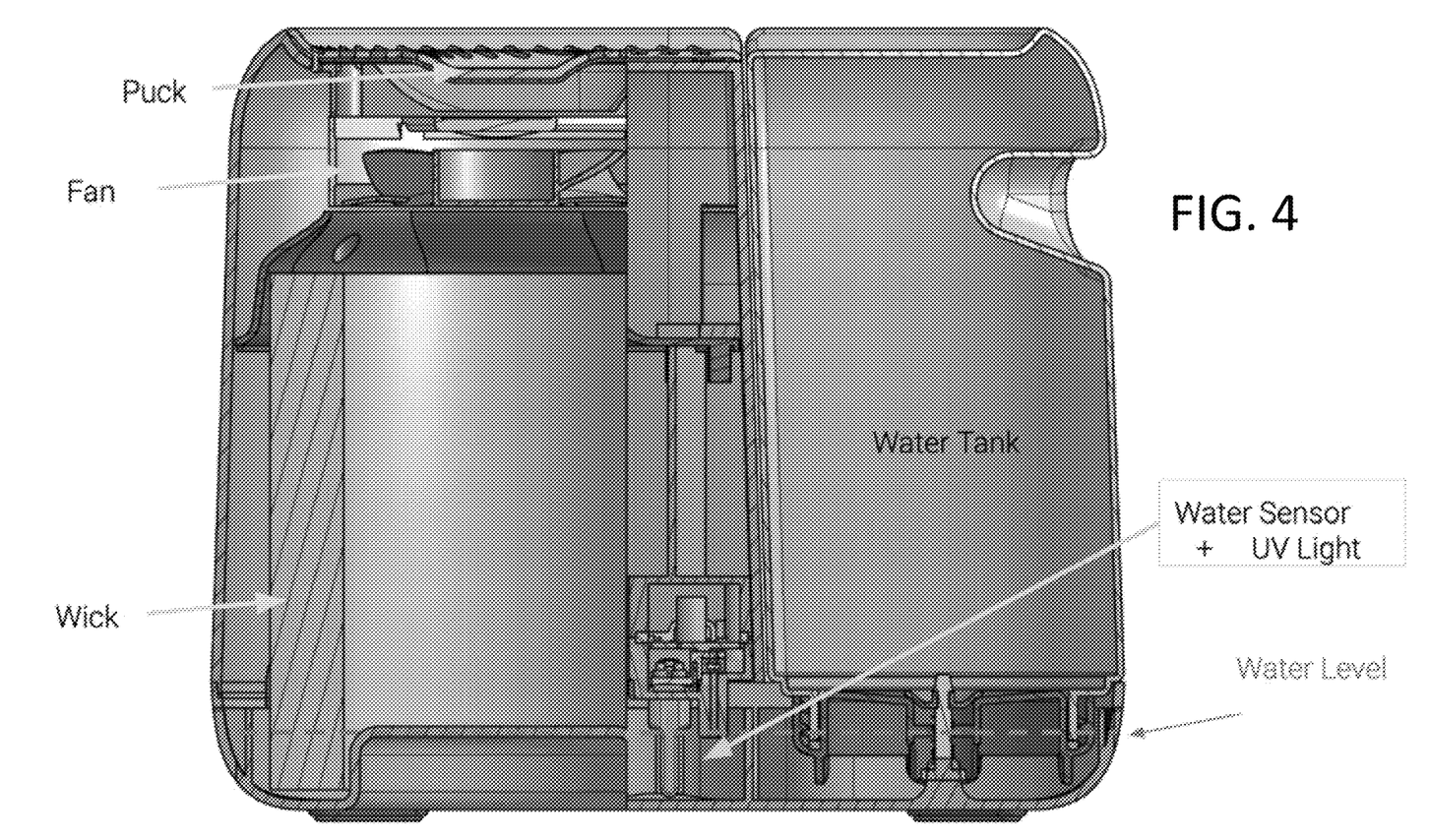
FIG. 4 illustrates a cross sectional overview of the humidifier, including the reservoir, tray, sensor, fan, wick and control panel.
Figure 5:
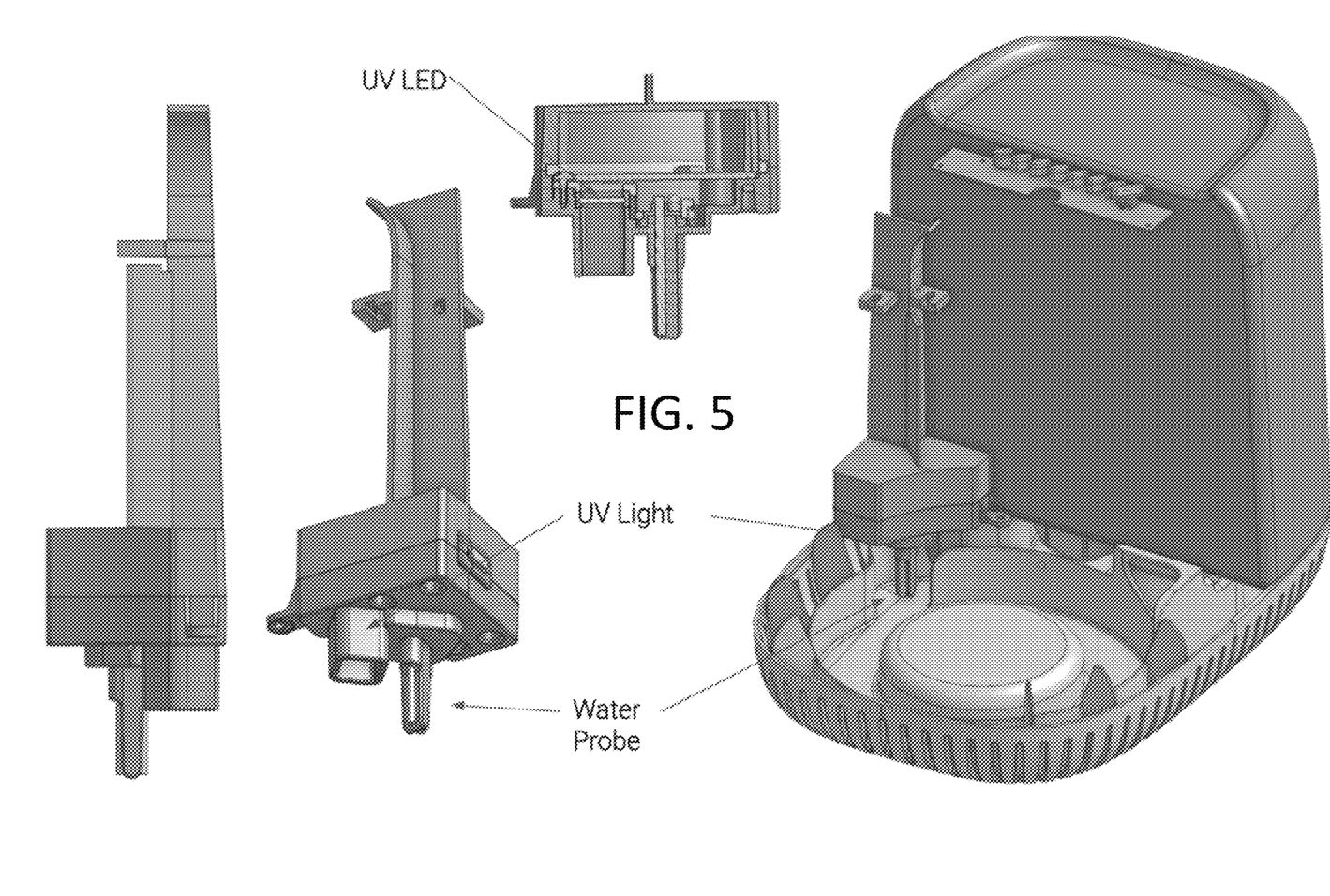
FIG. 5 illustrates various perspective views of components of a disinfecting UV LED and a water sensor.

FIG. 2 illustrates a vertical cross sectional view of the humidifier of FIG. 1 showing certain enumerated internal components. Referring to FIG. 2, the water tank 8 supplies water through a water valve and cap 9 to a reservoir tray 3. The reservoir tray 3 in turn supplies the water to a wick 2, through and which a fan 6 draws air when in operation.

An ultraviolet light source 5 can be configured to expose some or all of the interior of the humidifier, such as the reservoir tray 3, the wick 2, the fan 6 to UV light in order to kill microorganisms and/or reduce the growth of mold. The light source can be a UV LED or set of LEDs placed above a water containment feature between the reservoir and the wick. The UV LEDs can kill or destroy contaminants in the water that may lead to mold growth, including mold, bacteria and fungus.

A control circuit 7 can be configured to control and/or activate the ultraviolet light 5 and the fan 6. The control circuit can receive a signal from and/or be activated by a user control switch (not illustrated). The control circuit can also be configured to receive a signal from one or more water sensors 4.

In one embodiment, one or more water sensors 4 can be positioned and configured to indicate whether water is present in particular areas of the humidifier. The sensors can be positioned/configured to determine when the reservoir has become dry, such as when the tank has run out of water. In one embodiment a water sensor 4 can be positioned and configured to indicate whether the wick, or a certain portion of the wick is wet or dry. A water sensor 4 can be positioned in, on or around the wick 2 to determine wick wetness or water concentration on the wick.

In one embodiment, the control circuit 7 can be configured to activate the fan 6 or keep the fan activated whenever the reservoir tray 3 is wet, whenever the wick 2 is wet, or either whenever the reservoir tray or the wick is wet, based on signals from the one or more water sensors 4. The control circuit can also be configured to automatically deactivate the fan and/or the ultraviolet light when the tank, the reservoir and/or the wick is dry.

The humidifier can be configured to operate the fan for an extended period of time if water is sensed in the system. If a sensor no longer detects any water (change of state from wet to dry) within the system, the device can be programmed to drive the system's fan to run for a predetermined "dry out period" to ensure the wick and system are no longer damp and prone to mold/bacteria/fungus. The purpose of this feature is to ensure that the system remains "on" if water is detected in the product, which will prevent the environment to germinate and proliferation of mold in the system.

In one embodiment, the humidifier can include a water filter (not illustrated), such as a de-ionizing water filter, to remove dissolved minerals from water as it passes from the tank to the reservoir tray 3, in order to reduce scale build up on the wick.

With humidifiers being used primarily during sleep and not during the day, an auto mode can use an exterior light sensor (not illustrated) to detect if the room is light (assumed daytime) or dark (assumed nighttime). When high light is detected while in auto mode, the unit can be configured to change from a medium to a low fan setting. This change will preserve water and reduce the likelihood of mold. When low light is detected while in auto mode, the fan speed can be configured to change from low to medium to increase the moisture output during sleep hours.

In one embodiment, the humidifier can be configured to incorporate a separate component that provides aroma diffusion. A diffuser can be placed in line with the out flow of air. This promotes volatile diffusion of the fragrance into the air.

Method

A method can include operating a blower that passes air about or through a humidifying wick that has been made wet by a supply of water; determining a first absolute or relative time at which the wick ceases to be made wet by the supply of water; and automatically deactivating the blower at a second absolute or relative time, wherein the second time is later than the first time by an amount of time sufficient to cause the wick to be dried by the blower.

The supply of water can be one of a reservoir of water in which the wick is immersed, and a stream of water that flows through the wick.

"Determining a first absolute or relative time at which the wick ceases to be made wet by the supply of water" can include one of: determining that the reservoir of water has become dry, and stopping the stream of water.

"Determining a first absolute or relative time at which the wick ceases to be made wet by the supply of water" can include receiving a signal from a sensor, the signal indicating that the reservoir of water has become dry.

The sensor can be positioned: in or on the wick; or in the reservoir.

The second time can be a predetermined amount of time after the first time.

The method can further include: determining the second time based on measured ambient humidity.

The method can further include: determining the second time based on measured ambient humidity over time.

The determining the first absolute or relative time can consist of setting a timer.

The timer can be a countdown timer.

The "deactivating the blower" can be performed in response to expiration of the countdown timer.

The determining the first absolute or relative time can include recording a time.

The method can further include: automatically causing the wick to again be made wet by the supply of water at a third absolute or relative time, wherein the third time is later than the second time by an amount of time sufficient to inhibit the growth of microbes on the wick.

The method can further include reactivating the blower in association with "automatically causing the wick to again be made wet by the supply of water".

The method can further include: operating the blower in response to determining that the wick is wet or being made wet by the supply of water.

Computer Implementation

Components of the embodiments disclosed herein, which may be referred to as methods, processes, applications, programs, modules, engines, functions or the like, can be implemented by configuring one or more computers or computer systems using special purpose software embodied as instructions on a non-transitory computer readable medium. The one or more computers or computer systems can be or include one or more standalone, client and/or server computers, which can be optionally networked through wired and/or wireless networks as a networked computer system.

The special purpose software can include one or more instances thereof, each of which can include, for example, one or more of client software, server software, desktop application software, app software, database software, operating system software, and driver software. Client software can be configured to operate a system as a client that sends requests for and receives information from one or more servers and/or databases. Server software can be configured to operate a system as one or more servers that receive requests for and send information to one or more clients. Desktop application software and/or app software can operate a desktop application or app on desktop and/or portable computers. Database software can be configured to operate one or more databases on a system to store data and/or information and respond to requests by client software to retrieve, store, and/or update data. Operating system software and driver software can be configured to provide an operating system as a platform and/or drivers as interfaces to hardware or processes for use by other software of a computer or computer system. By way of example, any data created, used or operated upon by the embodiments disclosed herein can be stored in, accessed from, and/or modified in a database operating on a computer system.

Figure 6:
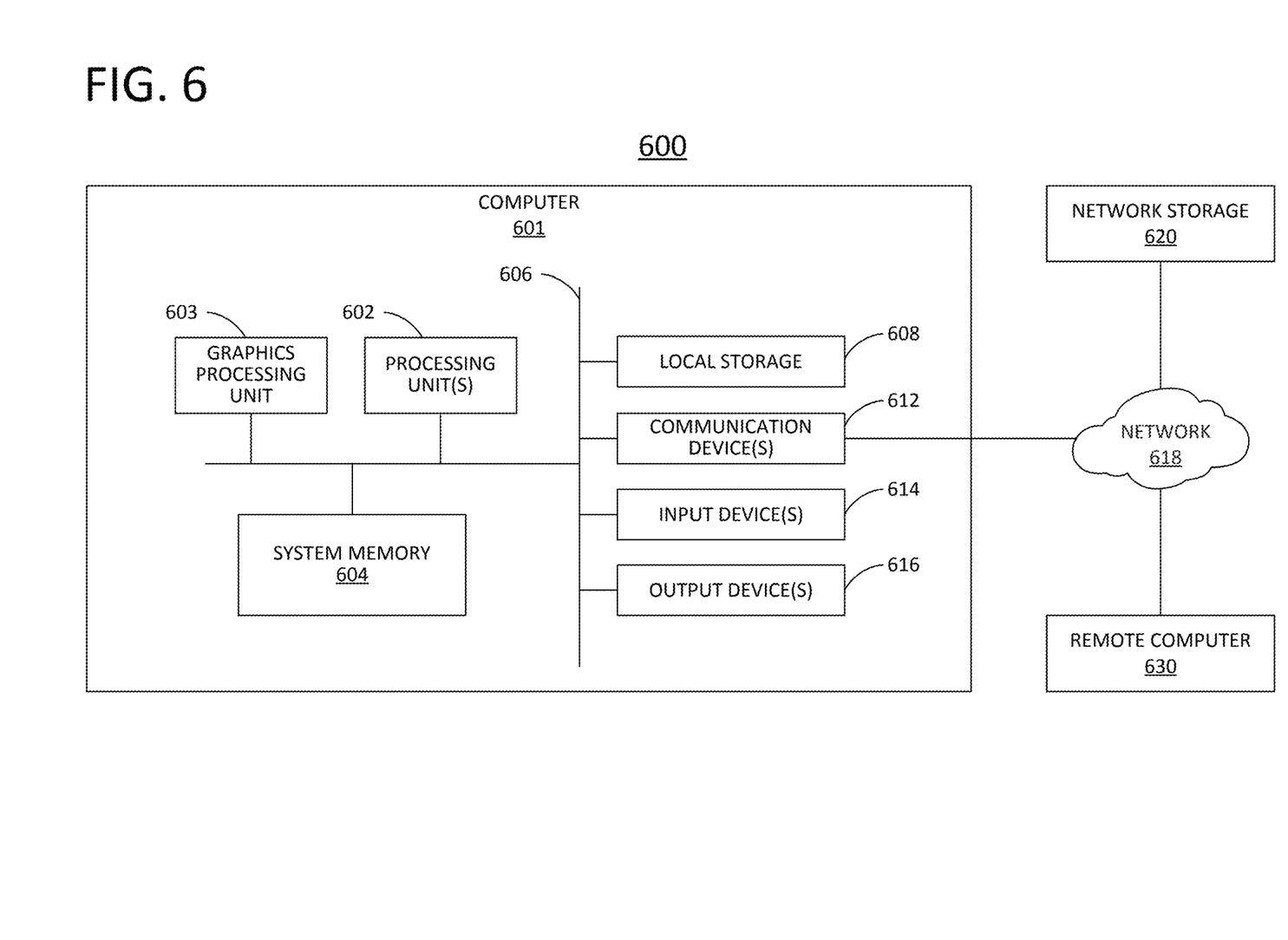
FIG. 6 illustrates a general computer architecture that can be appropriately configured to implement components, such as the control circuit, disclosed in accordance with various embodiments

FIG. 6 illustrates a general computer architecture 600 that can be appropriately configured to implement components, such as the control circuit 7, disclosed in accordance with various embodiments. The computing architecture 600 can include various common computing elements, such as a computer 601, a network 618, and one or more remote computers 630. The embodiments disclosed herein, however, are not limited to implementation by the general computing architecture 600.

Referring to FIG. 6, the computer 601 can be any of a variety of general purpose computers such as, for example, a server, a desktop computer, a laptop computer, a tablet computer or a mobile computing device. The computer 601 can include a processing unit 602, a system memory 604 and a system bus 606.

The processing unit 602 can be or include one or more of any of various commercially available computer processors, which can each include one or more processing cores that can operate independently of each other. Additional co-processing units, such as a graphics processing unit 603, also can be present in the computer.

The system memory 604 can include volatile devices, such as dynamic random access memory (DRAM) or other random access memory devices. The system memory 604 can also or alternatively include non-volatile devices, such as a read-only memory or flash memory.

The computer 601 can include local non-volatile secondary storage 608 such as a disk drive, solid state disk, or removable memory card. The local storage 608 can include one or more removable and/or non-removable storage units. The local storage 608 can be used to store an operating system that initiates and manages various applications that execute on the computer. The local storage 608 can also be used to store special purpose software configured to implement the components of the embodiments disclosed herein and that can be executed as one or more applications under the operating system.

The computer 601 can also include communication device(s) 612 through which the computer communicates with other devices, such as one or more remote computers 630, over wired and/or wireless computer networks 618. Communications device(s) 612 can include, for example, a network interface for communicating data over a wired computer network. The communication device(s) 612 can include, for example, one or more radio transmitters for communications over Wi-Fi, Bluetooth, and/or mobile telephone networks.

The computer 601 can also access network storage 620 through the computer network 618. The network storage can include, for example, a network attached storage device located on a local network, or cloud-based storage hosted at one or more remote data centers. The operating system and/or special purpose software can alternatively be stored in the network storage 620.

The computer 601 can have various input device(s) 614 such as a keyboard, mouse, touchscreen, camera, microphone, accelerometer, thermometer, magnetometer, or any other sensor. Output device(s) 616 such as a display, speakers, printer, or eccentric rotating mass vibration motor can also be included.

The various storage 608, communication device(s) 612, output devices 616 and input devices 614 can be integrated within a housing of the computer, or can be connected through various input/output interface devices on the computer, in which case the reference numbers 608, 612, 614 and 616 can indicate either the interface for connection to a device or the device itself as the case may be.

Any of the foregoing aspects may be embodied in one or more instances as a computer system, as a process performed by such a computer system, as any individual component of such a computer system, or as an article of manufacture including computer storage in which computer program instructions are stored and which, when processed by one or more computers, configure the one or more computers to provide such a computer system or any individual component of such a computer system. A server, computer server, a host or a client device can each be embodied as a computer or a computer system. A computer system may be practiced in distributed computing environments where operations are performed by multiple computers that are linked through a communications network. In a distributed computing environment, computer programs can be located in both local and remote computer storage media.

Each component of a computer system such as described herein, and which operates on one or more computers, can be implemented using the one or more processing units of the computer and one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

Components of the embodiments disclosed herein, which may be referred to as modules, engines, processes, functions or the like, can be implemented in hardware, such as by using special purpose hardware logic components, by configuring general purpose computing resources using special purpose software, or by a combination of special purpose hardware and configured general purpose computing resources. Illustrative types of hardware logic components that can be used include, for example, Field-programmable Gate Arrays (FPGAs), Application-specific Integrated Circuits (ASICs), Application-specific Standard Products (ASSPs), System-on-a-chip systems (SOCs), and Complex Programmable Logic Devices (CPLDs).

CONCLUSION

Although the subject matter has been described in terms of certain embodiments, other embodiments that may or may not provide various features and aspects set forth herein shall be understood to be contemplated by this disclosure. The specific embodiments set forth herein are disclosed as examples only, and the scope of the patented subject matter is defined by the claims that follow.

In the claims, the terms "based upon" and "based on" shall include situations in which a factor is taken into account directly and/or indirectly, and possibly in conjunction with other factors, in producing a result or effect. In the claims, a portion shall include greater than none and up to the whole of a thing. In method claims, any reference characters are used for convenience of description only, and do not indicate a particular order for performing a method.

The invention claimed is:

1. A method for operating a humidifier, the method comprising the steps of:
  operating a blower that passes air about or through a humidifying wick that has been made wet by water located within a reservoir of water, and through a channel over which a puck configured to provide volatile diffusion of a fragrance into surrounding air resides, the puck consisting of a unibody piece and disposed vertically above both the blower and the channel within a recess inset into a top surface of an enclosure encasing at least the blower and reservoir of water, such that at least a bottom side of the puck abuts the recess;
  determining a first absolute or relative time at which the wick ceases to be made wet by the water by receiving a signal from a water sensor disposed within the reservoir of water, the signal indicating that the reservoir of water has become dry; and
  automatically deactivating the blower at a second absolute or relative time, the second absolute or relative time being (a) a predetermined amount of time after the first absolute or relative time, (b) later than the first absolute or relative time, and (c) predetermined based on at least one measured ambient humidity.

2. The method of claim 1, wherein the step of determining a first absolute or relative time at which the wick ceases to be made wet by the supply of water comprises determining that the reservoir of water has become dry.

3. The method of claim 1, wherein the determining the first absolute or relative time comprises recording a time.

4. The method of claim 1, further comprising:
  automatically causing the wick to again be made wet by the water at a third absolute or relative time, wherein the third absolute or relative time is later than the second absolute or relative time by an amount of time sufficient to inhibit the growth of microbes on the wick.

5. The method of claim 4, further comprising, reactivating the blower in association with automatically causing the wick to again be made wet by the water.

6. The method of claim 1, further comprising:
  operating the blower in response to determining that the wick is wet or being made wet by the water.

7. A method for operating a humidifier, the method comprising the steps of:
  operating a blower that passes air about or through a humidifying wick that has been made wet by water located within a reservoir of water, and a puck configured to provide volatile diffusion of a fragrance into surrounding air, the puck consisting of a unibody piece and disposed vertically above the blower within a recess inset into a top surface of an enclosure encasing at least the blower and reservoir of water, such that at least a bottom side of the puck abuts the recess;
  determining a first absolute or relative time at which the wick ceases to be made wet by the water by receiving a signal from a water sensor disposed at least in or on the wick, the signal indicating that a reservoir of water has become dry; and
  automatically deactivating the blower at a second absolute or relative time, the second absolute or relative time being (a) a predetermined amount of time after the first absolute or relative time, and (b) later than the first absolute or relative time by an amount of time sufficient to cause the wick to be dried by the blower.

8. The method of claim 7, wherein there are a plurality of water sensors positioned at least in or on the wick and in the reservoir.

9. A method for operating a humidifier, the method comprising the steps of:
  operating a blower that passes air about or through a humidifying wick that has been made wet by water located within a reservoir of water, and through a channel over which a puck configured to provide volatile diffusion of a fragrance into surrounding air resides, the puck being disposed vertically above the blower and the channel within a recess inset into a top surface of an enclosure encasing at least the blower and reservoir of water;
  determining a first absolute or relative time at which the wick ceases to be made wet by the water; and
  automatically deactivating the blower at a second absolute or relative time, the second absolute or relative time being later than the first absolute or relative time by an amount of time sufficient to cause the wick to be dried by the blower.

10. The method of claim 9, wherein determining a first absolute or relative time at which the wick ceases to be made wet by the water comprises receiving a signal from a water sensor, the signal indicating that a reservoir of water has become dry.

11. The method of claim 10, wherein the water sensor is positioned at least in or on the wick.

12. The method of claim 10, wherein there are a plurality of water sensors positioned at least in or on the wick and in the reservoir of water.

* * * * *